(12) United States Patent
Mergard (10) Patent No.: US 6,327,508 B1
(45) Date of Patent: Dec. 4, 2001

(54) PROGRAMMABLE STATE MACHINE

(75) Inventor: Jim Mergard, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/208,909

(22) Filed: Dec. 10, 1998

(51) Int. Cl.$^7$ .............................. G05B 15/00; G06B 12/00
(52) U.S. Cl. ........................... 700/5; 700/1; 711/203; 711/220
(58) Field of Search .................... 700/1, 9, 7, 5, 700/86, 18, 19, 13, 169, 28; 711/1, 118, 167, 203, 220; 714/30

(56) References Cited

U.S. PATENT DOCUMENTS

| | | |
|---|---|---|
| 4,876,640 | 10/1989 | Shankar et al. ................ 415/204 |
| 4,879,481 | 11/1989 | Pathak et al. .................. 326/46 |
| 4,965,472 | 10/1990 | Anderson ...................... 326/46 |
| 4,970,418 | 11/1990 | Masterson ..................... 327/141 |
| 5,023,484 | 6/1991 | Pathak et al. .................. 326/46 |
| 5,280,595 * | 1/1994 | Lemany et al. ................ 700/9 |
| 5,301,100 * | 4/1994 | Wagner ........................ 700/28 |
| 5,557,782 | 9/1996 | Witkowski et al. ............ 713/600 |
| 5,867,644 | 2/1999 | Ranson et al. ................ 714/39 |
| 5,881,217 * | 3/1999 | Ranson et al. ................ 700/7 |
| 5,905,902 * | 5/1999 | O'Connor ..................... 711/11 |

* cited by examiner

Primary Examiner—William Grant
Assistant Examiner—Kidest Bahta
(74) Attorney, Agent, or Firm—Akin, Gump, Strauss, Hauer & Feld LLP (57) ABSTRACT

A programmable state machine provides a capability of dynamically changing state-machine functions. State machine programming may be accomplished dynamically by a processor through a plurality of mask registers. The plurality of mask registers provide for selective enabling and disabling of input values and transition values of the programmable state machine.

23 Claims, 5 Drawing Sheets

PROGRAMMABLE STATE MACHINE

BACKGROUND OF THE INVENTION

1. Field of the Invention

The present invention relates to hardware state machines for microcontrollers, and more particularly to a programmable state machine.

2. Description of the Related Art

Microcontrollers

As technology advances, computer system components are providing specific services which previously were offered by a microprocessor or the computer system as a whole. A centerpiece of this advancing technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or Am186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80x86 microprocessor instructions, allowing for software to be easily developed for such microcontrollers. Because of the similar execution unit instruction sets, the added features often become principal differentiating criteria between particular microcontrollers.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. An execution unit should be free to perform the programmed task to which it is dedicated, rather than spending time waiting on other units within the microcontroller.

State Machines

For many system control applications, sequential logic designers are utilizing state machines rather than complex microprocessors to provide speed and sufficient functionality without undue complexity. One advantage of transferring certain functions from a microprocessor to a state machine is freeing the microprocessor to perform other functions. Examples of functions which have been efficiently translated into state machines include vector control for a Fast Fourier Transform (FFT) algorithm, addressing by a controller, encoding and decoding, encryption and decryption, arbitration, event monitoring, and simple control functions.

A state machine is essentially a digital device that traverses through a predetermined sequence of states in an orderly fashion. A simple state machine includes two essential elements: combinatorial logic and memory. The memory is used to store the state of the machine. The combinatorial logic may be viewed as two distinct functional blocks: the next state decoder and the output decoder. The next state decoder determines the next state of the state machine while the output decoder generates the actual outputs. A state machine traverses through a sequence of states, where the next state is determined by the next state decoder, depending upon the current state and input conditions. A state machine also provides sequences of output signals based upon state transitions. The outputs are generated by the output decoder based upon the current state and input conditions. There are two widely known types of state machines: Mealy and Moore. Moore state machine outputs are a function of the current state only. In Mealy-type state machines, the outputs are functions of both the current state and the input conditions.

So far as is known, prior art programmable state machines have required state machine functions to be hardwired in silicon.

SUMMARY OF THE INVENTION

Briefly, a system according to the present invention provides a programmable state machine. The programmable state machine may include transition/output logic for providing first signals corresponding to next state and output information, a plurality of state registers for receiving the first signals corresponding to next state and output information and providing second signals corresponding to current state information to the transition/output logic, and a plurality of mask registers for selectively providing third signals corresponding to masking information to the transition/output logic. The programmable state machine may further include a comparator mask coupled between a portion of the plurality of mask registers and a portion of the transition/output logic. The plurality of mask registers may include a plurality of input mask registers for selectively enabling and disabling input values to the transition/output logic and a plurality of transition mask registers for selectively enabling and disabling transition values for the transition/output logic. Further, the plurality of mask registers may include a plurality of level inhibit registers for selectively enabling and disabling logic terms corresponding to a particular level of the transition/output logic.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
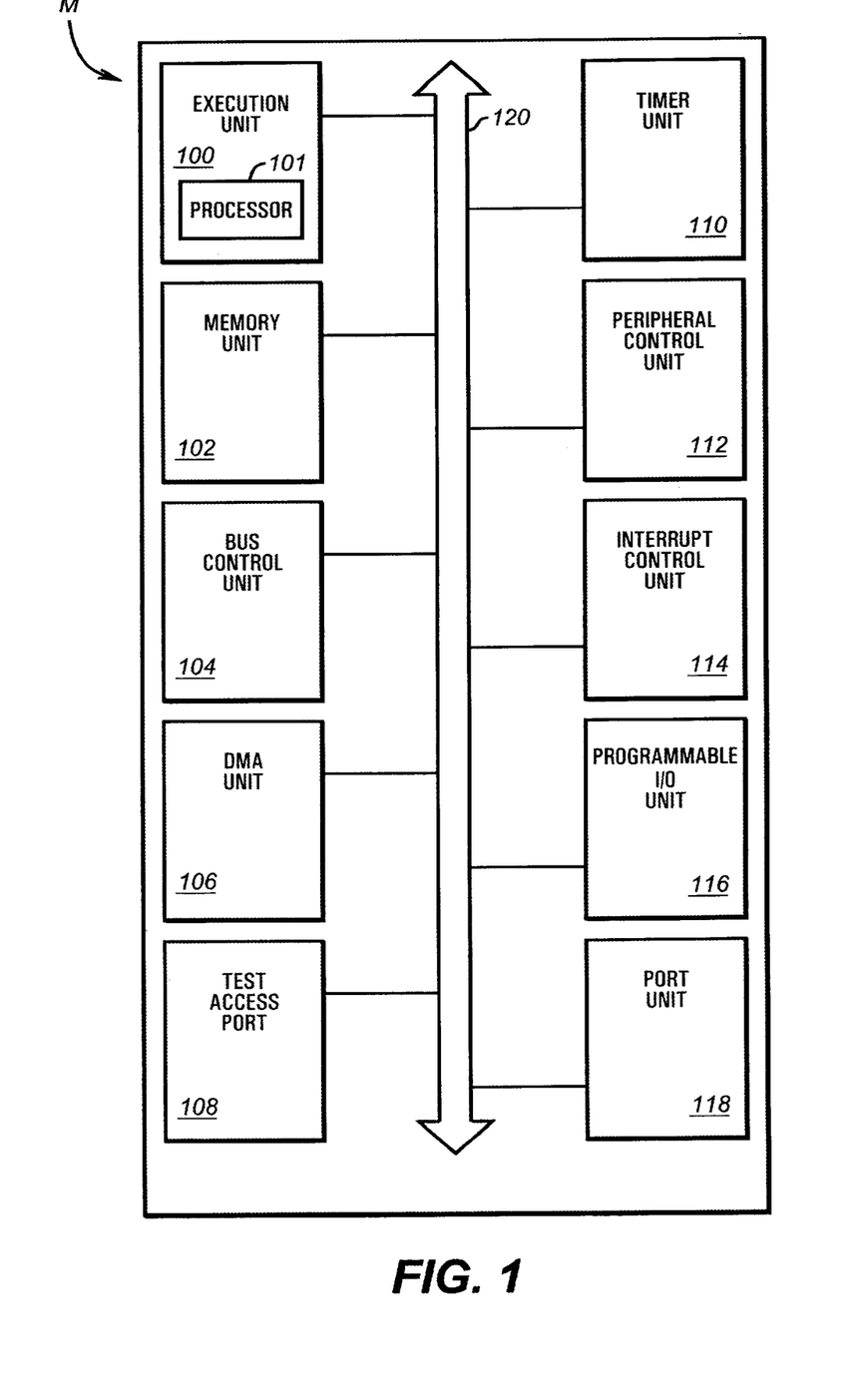
FIG. 1 is a block diagram of a microcontroller.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the Am286 instruction set implemented in a variety of microcontrollers from Advanced Micro Devices, Inc. of Sunnyvale, Calif. A variety of other execution units could be used instead of the execution unit 100.

The memory unit 102 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and/or synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory access transfers between the units of the microcontroller M. The test access port 108 provides a scan interface for testing the microcontroller M in a production environment and supports a test access port (TAP) controller for controlling test logic of the port 108.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/O unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high speed transfers. The serial port interface and infrared interface may be driven by an industry-standard universal asynchronous receiver/transmitter (UART) so as to permit PC compatibility.

A variety of configurations and combinations of these units of the microcontroller M are possible. The microcontroller M, for example, could be the Am186™ED microcontroller, the Elan™SC400 microcontroller, or the Am186™TCC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
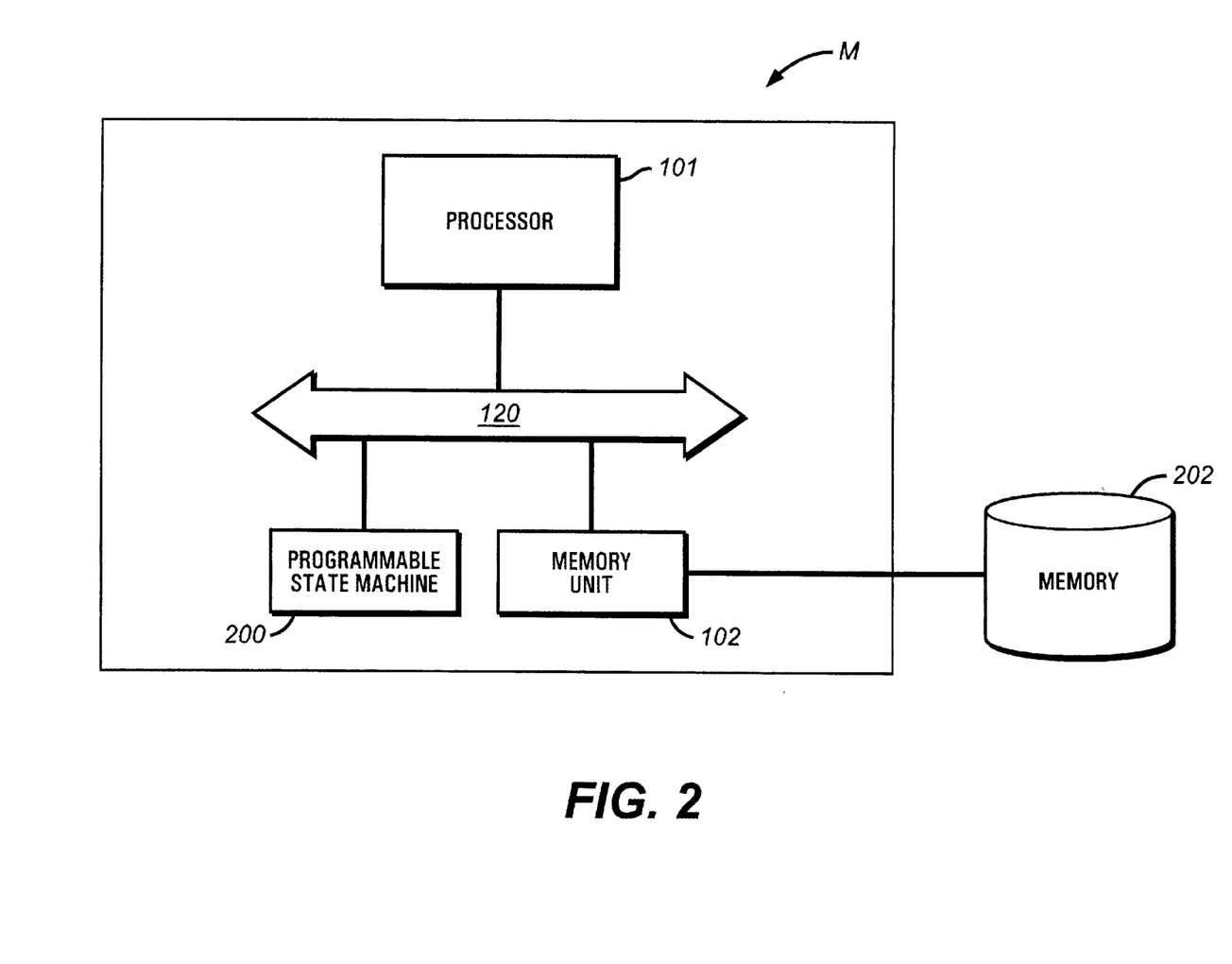
FIG. 2 is a block diagram of a portion of the microcontroller of FIG. 1 providing a programmable state machine in accordance with the present invention.

Referring to FIG. 2, a portion of the microcontroller M is shown. In accordance with the present invention, the microcontroller M provides a programmable state machine 200. In the disclosed embodiment, the programmable state machine 200 is coupled to the internal bus 120. The programmable state machine may be programmed by the processor 101 or the memory unit 102 with data loaded from an external memory 202. The external memory 202 is coupled to the memory unit 102 of the microcontroller M.

Figure 3:
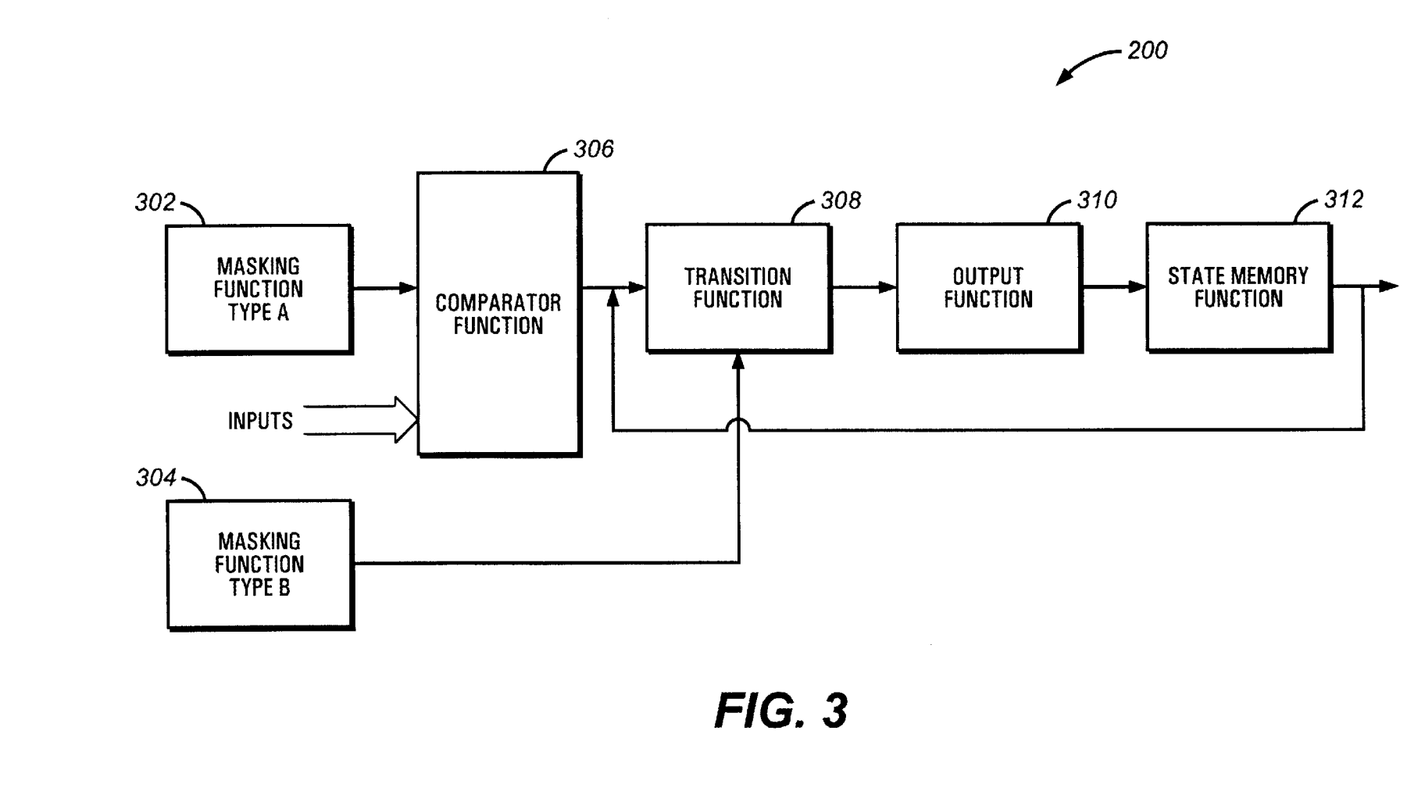
FIG. 3 is an exemplary functional diagram of the programmable state machine of FIG. 2 in accordance with the present invention.

Referring to FIG. 3, an exemplary functional diagram of the programmable state machine 200 is shown. Like a typical state machine, the programmable state machine 200 provides a transition or next state function 308, an output function 310, and a state memory function 312. In the disclosed programmable state machine 200, the transition function 308 receives input signals and current state signals and provides transition signals to the output function 310, the output function 310 provides output signals to the state memory function 312, and the state memory function 312 provides current state signals to the transition function 308. It should be understood that the signal relationship among the transition function 308, the output function 310, and the state memory function 312 may vary from the illustrated signal relationship. As an example, a signal relationship among the transition function 308, the output function 310, and the state memory function 312 configured for a Moore-type programmable state machine 200 would likely differ from a signal relationship among the transition function 308, the output function 310, and the state memory function 312 configured for a Mealy-type programmable state machine 200.

Programmability of the programmable state machine 200 is achieved through a plurality of masking functions which may be programmed by the processor 101. The plurality of masking functions may be integrated into the programmable state machine 200 or may be externally coupled to the programmable state machine 200. The disclosed programmable state machine 200 provides two types of masking functions: masking function type A and masking function type B. Masking function type A is an input masking function 302. The input masking function 302 permits selective enabling and disabling of input values or terms (INPUTS) for the programmable state machine 200. In the disclosed embodiment, input values for the programmable state machine 200 and input masking information from the input masking function 302 are both provided to a comparator function 306. The comparator function 306 compares the input values and the input masking information so as to selectively enable and disable certain input values. The input masking function 202 in combination with the comparator function 306 handles enabling and disabling of input values to any level or array of the transition function 308. The enabled input values may be passed to the transition function 308.

Masking function type B is a transition or next state masking function 304. The transition masking function 304 permits selective enabling and disabling of transition values or terms for the programmable state machine 200. More particularly, the transition masking function 304 handles enabling and disabling of logic stages or arrays of the transition function 308 and selecting of state decode for the logic stages or arrays. The transition masking function 304 provides transition masking information to the transition function 308. In this way, transition or next state values are selectively enabled and disabled for the programmable state machine 200.

Logic for implementing the transition function 308 and the output function 310 may include multi-level logic arrays. If the transition function 308 provides a multi-level logic array, then the transition masking function 304 may be directed to a particular level or stage of the multi-level logic array. For example, the transition masking function 304 may be configured to selectively enable and disable transition values for a particular level or stage of the transition function 308. A masking function which is directed to logic terms on a particular logic level basically provides a level inhibit function.

Figure 4:
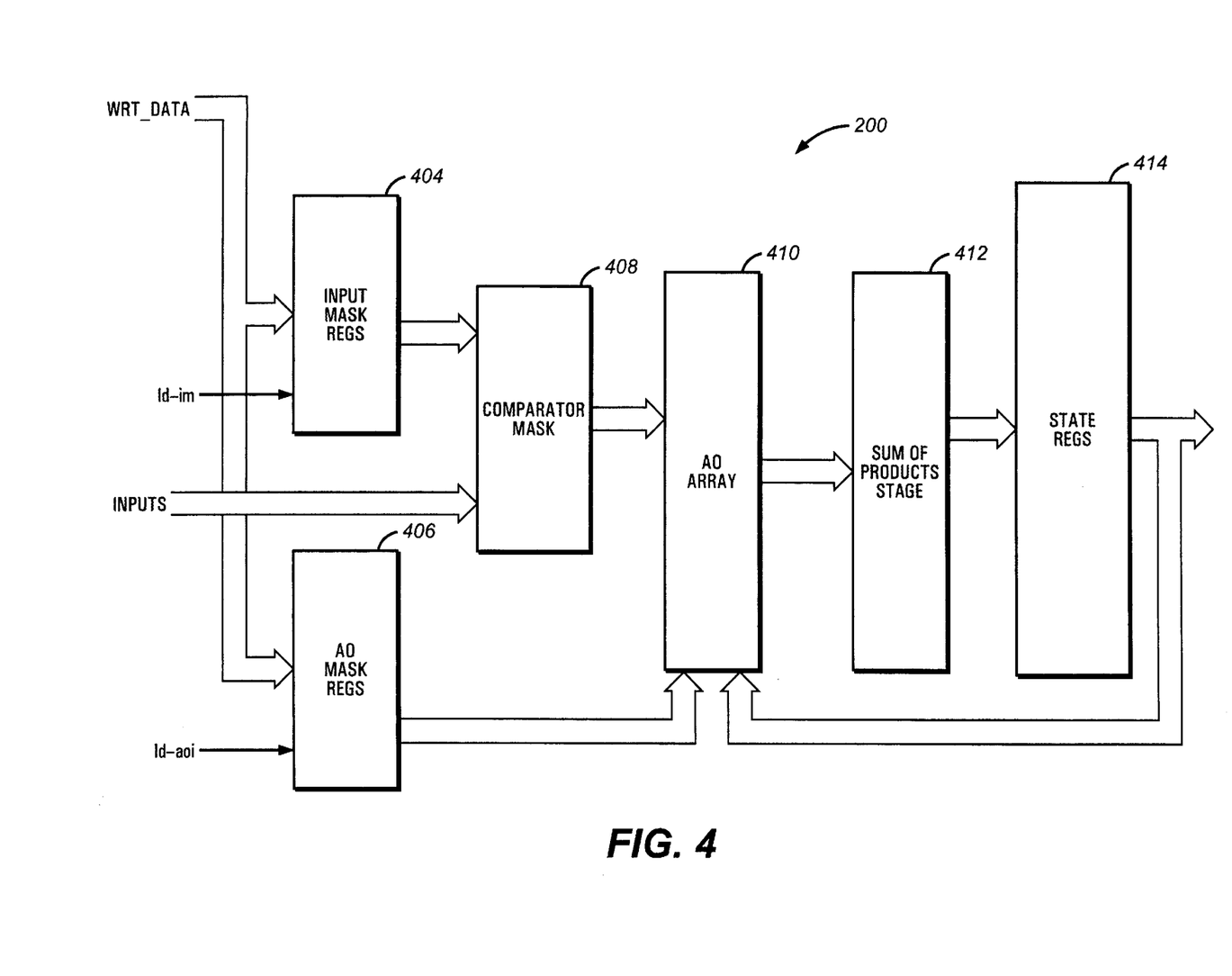
FIG. 4 is an exemplary schematic diagram of the programmable state machine of FIG. 2 in accordance with the present invention.

Referring to FIG. 4, an exemplary schematic diagram of the programmable state machine 200 is shown. The programmable state machine 200 includes a plurality of logic blocks. The plurality of logic blocks include an AND-OR (AO) array 410, a sum of products (SOP) stage array 412, a plurality of state registers 414, a comparator mask 408, a plurality of AO mask registers 406, and a plurality of input mask registers 404. The plurality of input mask registers 404 and the plurality of AO mask registers 406 may receive write data in the form of a write data bus WRT_DATA. The comparator mask 408 receives input masking information from the plurality of input mask registers 404 and input values (INPUTS) for the programmable state machine 200. By comparing the input masking information with the inputs, the comparator mask 408 selects input values. The AO array 410 receives the selected input values from the comparator mask 408. The AO array 410 also receives AO masking information from the plurality of AO masking registers 406.

The AO array 410 provides transition signals to the SOP stage array 412, and the SOP stage array 412 provides output signals to the plurality of state registers 414. The plurality of state registers 414 provide current state information in the form of a current state bus Current_State_Bus back to the AO array 410. The plurality of input mask registers 404 and the plurality of AO mask registers 406 may respectively receive load signals, 1d_im and 1d_aoi, for loading masking information to these mask registers. In the disclosed exemplary embodiment, the plurality of input mask registers 404, the plurality of AO mask registers 406, and the plurality of state registers 414 are each clocked by a common clock signal (not shown).

Each input mask register of the plurality of input mask registers 404 may include an enable bit and a polarity bit for each input to the AO array 410. It will be appreciated by those skilled in the art that the AO array 410 includes an AND array and an OR array. Utilizing an enable bit, the inputs to an OR array of the AO array 410 are selectively enabled and disabled. By utilizing a polarity bit for each input of the AO array 410, the plurality of input mask registers 404 provide control over polarity of the inputs to the OR array of the AO array 410. The use of enable bits and polarity bits is further described below.

The plurality of logic blocks of the programmable state machine 200 may be correlated with the functional blocks (FIG. 3) of the programmable state machine 200. The AO array 410 corresponds to the transition function 308. The SOP stage array 412 corresponds to the output function 310. The AO array 410 and the SOP stage array 412 collectively may be termed the transition/output logic. The plurality of state registers 414 corresponds to the state memory function 312. The comparator mask 408 corresponds to the comparator function 306. The plurality of AO mask registers 406 correspond to the transition masking function 304 (masking function type B). The plurality of input mask registers 404 correspond to the input masking function 302 (masking function type A). The disclosed plurality of logic blocks are illustrative and not exhaustive.

Figure 5:
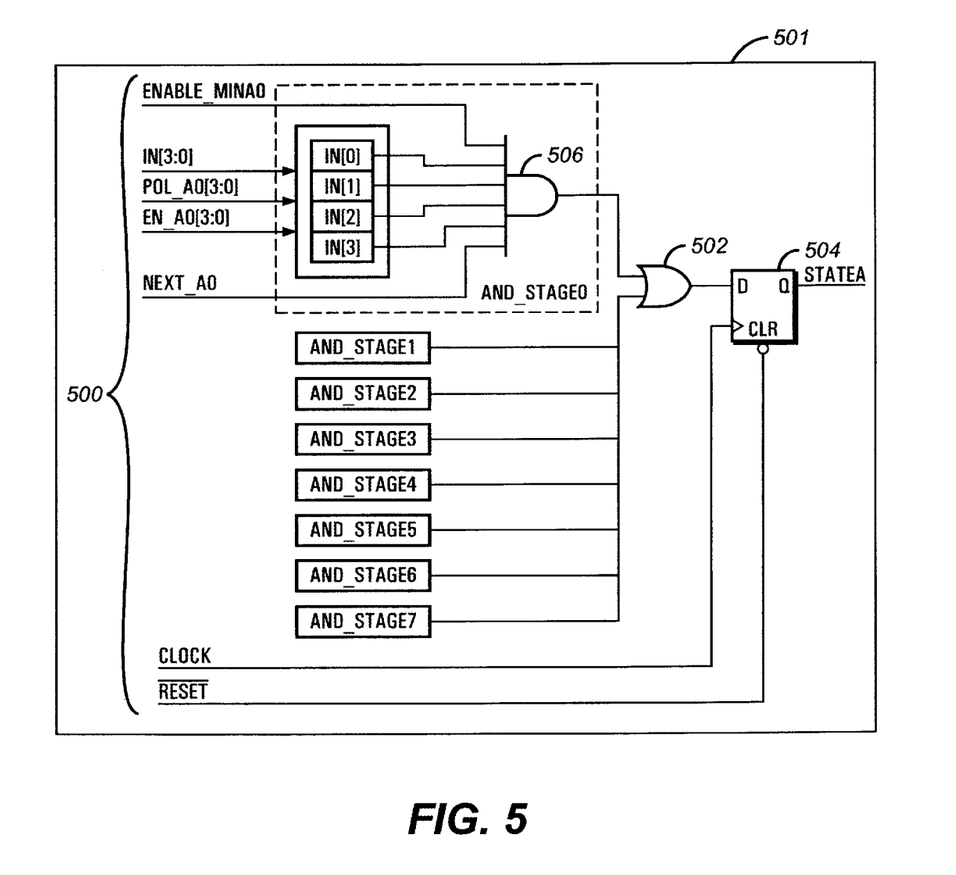
FIG. 5 is an exemplary logic diagram of a portion of the programmable state machine of FIG. 2 in accordance with the present invention.

Referring to FIG. 5, a logic diagram of a portion 501 of the programmable state machine 200 per state is shown. An AND array 500 and an OR array 502 correspond to the AO array 410 (FIG. 4). A state register 504 corresponds to the state registers 414 (FIG. 4).

In the disclosed exemplary embodiment, the AND array 500 includes 8 AND stages AND_STAGE0 through AND_STAGE7. It should be understood that any number of AND stages may be supported. AND_STAGE0, designated by phantom line, is illustrated internally. AND_STAGE0 receives four inputs IN[3:0] and four control signals, ENABLE_MINA0, POL_A0[3.0], EN_AO[3:0], and NEXT_A0. Polarity bits POL_A0[3:0] and enable bits EN_A0[3:0] are provided to the AND_STAGE0 by the input mask registers 404. The enable bits EN_A0[3:0] permit selective enabling and disabling of the inputs IN[3:0]. The polarity bits POL_A0[3:0] control the polarity of the inputs IN[3:0]. ENABLE_MINA0 is a minterm enable for the AND_STAGE0. ENABLE_MINA0 is the bit for enabling the AND_STAGE0. ENABLE_MINA0 is provided to the AND_STAGE0 by the AOI mask registers 406. NEXT_A0 is a next state signal used in selecting state decode for the AND_STAGE0. The AND gate 506 of the AND_STAGE0 receives the four inputs IN[3:0], the minterm enable signal ENABLE_MINA0, and the next state signal NEXT_A0 as input signals. The output signal of the AND gate 506 is provided as an input signal to the OR array 502. The other AND stages AND_STAGE1 through AND_STAGE7 are of like construction and operation as AND_STAGE0. The disclosed OR array 502 receives eight OR inputs to supports eight AND stages. It should be understood that types of logic other than AND and OR logic may alternatively be used.

In the disclosed embodiment, the state register 504 is a D flip-flop. Alternatively, other forms of state memory or storage may be used. The register 504 is clocked by a clock signal CLOCK and receives a reset signal $\overline{\text{RESET}}$ at its clear input CLR. The D input of the state register 504 receives an output of the OR array 502 as the excitation signal. The register 504 provides from its Q output a state signal STATEA. As will be appreciated by those skilled in the art, the state register 504 samples its D input and transfers the sampled value to its Q output at the rising or falling edge of the clock signal CLOCK. Further, those skilled in the art can readily derive excitation equations and transition equations for the exemplary programmable state machine 200 from FIG. 5.

A programmable state machine according to the present invention thus allows for state-machine functions to be changed dynamically. This capability provides for added flexibility in programming and debugging hardware state machines.

The foregoing disclosure and description of the preferred embodiment are illustrative and explanatory thereof, and various changes in the components, logic, signals, arrangement of logical arrays and blocks, arrangement of functional blocks, and state memory elements, as well as in the details of the illustrated circuitry and construction and method of operation may be made without departing from the spirit of the invention.

What is claimed is:

1. A programmable state machine, comprising:
   transition/output logic for providing first signals corresponding to next state and output information;
   a plurality of state registers for receiving the first signals corresponding to next state and output information from the transition/output logic and providing second signals corresponding to current state information to the transition/output logic; and
   a plurality of mask registers for selectively providing third signals corresponding to masking information to the transition/output logic,
   wherein the masking information comprises input masking information and transition masking information for the programmable state machine.

2. The programmable state machine of claim 1, further comprising:
   a comparator mask coupled between a portion of the plurality of mask registers and a portion of the transition/output logic.

3. The programmable state machine of claim 1, the plurality of mask registers comprising:
   a plurality of input mask registers for selectively enabling and disabling input values for the transition/output logic.

4. The programmable state machine of claim 3, each register of the plurality of input mask registers comprising:
   a plurality of polarity bits for controlling polarity of the input values.

5. The programmable state machine of claim 3, each register of the plurality of input mask registers comprising:
   a plurality of enable bits for enabling and disabling input values.

6. The programmable state machine of claim 1, the plurality of mask registers comprising:

a plurality of transition mask registers for selectively enabling and disabling transition values for the transition/output logic.

7. The programmable state machine of claim 1, the plurality of mask registers comprising:
   a plurality of level inhibit registers for selectively enabling and disabling logic terms corresponding to a level of the transition/output logic.

8. A microcontroller, comprising:
   a processor;
   a memory unit coupled to the processor; and
   a programmable state machine coupled to the processor, comprising:
      transition/output logic for providing first signals corresponding to next state and output information;
      a plurality of state registers for receiving the first signals corresponding to next state and output information from the transition/output logic and providing second signals corresponding to current state information to the transition/output logic; and
      a plurality of mask registers for selectively providing third signals corresponding to masking information to the transition/output logic,
      wherein the masking information comprises input masking information and transition masking information for the programmable state machine.

9. The microcontroller of claim 8, the programmable state machine further comprising:
   a comparator mask coupled between a portion of the plurality of mask registers and a portion of the transition/output logic.

10. The microcontroller of claim 8, the plurality of mask registers comprising:
    a plurality of input mask registers for selectively enabling and disabling input values for the transition/output logic.

11. The microcontroller of claim 10, each register of the plurality of input mask registers comprising:
    a plurality of polarity bits for controlling polarity of the input values.

12. The microcontroller of claim 10, each register of the plurality of input mask registers comprising:
    a plurality of enable bits for enabling and disabling input values.

13. The microcontroller of claim 8, the plurality of mask registers comprising:
    a plurality of transition mask registers for selectively enabling and disabling transition values for the transition/output logic.

14. The microcontroller of claim 8, the plurality of mask registers comprising:
    a plurality of level inhibit registers for selectively enabling and disabling logic terms corresponding to a level of the transition/output logic.

15. A programmable state machine, comprising:
    a means for decoding next states and generating output signals;
    a means for providing current states to the means for decoding next states and generating output signals; and
    a means for selectively enabling and disabling input values and transition values for the means for decoding next states and generating output signals.

16. The programmable state machine of claim 15, further comprising:
    a means for comparing input signals with the means for selectively enabling and disabling values.

17. The programmable state machine of claim 15, the means for selectively enabling and disabling values comprising:
   a means for selectively enabling and disabling input values for the means for decoding next states and generating output signals.

18. The programmable state machine of claim 15, the means for selectively enabling and disabling values comprising:
   a means for selectively enabling and disabling transition values for the means for decoding next states and generating output signals.

19. The programmable state machine of claim 15, the means for selectively enabling and disabling values comprising:
   a means for selectively enabling and disabling logic terms corresponding to a level of the means for decoding next states and generating output signals.

20. A method of programmably traversing a plurality of states, comprising the steps of:
   selectively providing signals corresponding to masking information;
   generating signals corresponding to next state and output information based on the signals corresponding to masking information; and
   generating signals corresponding to current state information based on the signals corresponding to next state and output information,
   wherein the masking information comprises input masking information and transition masking information.

21. The method of claim 20, further comprising the step of:
   applying the signals corresponding to masking information to input information.

22. The method of claim 20, further comprising the step of:
   applying the signals corresponding to masking information to transition information.

23. A programmable state machine, comprising:
   transition/output logic for providing signals corresponding to next state and output information and receiving signals corresponding to masking information, the signals corresponding to next state and output information being based on the signals corresponding to masking information; and
   a plurality of state registers for receiving the signals corresponding to next state and output information and providing signals corresponding to current state information to the transition/output logic,
   wherein the masking information comprises input masking information and transition masking information for the programmable state machine.

* * * * *